United States Patent
Mitsubori et al.

(10) Patent No.: US 9,103,424 B2
(45) Date of Patent: Aug. 11, 2015

(54) VEHICLE DRIVING FORCE TRANSMISSION STRUCTURE

(71) Applicant: HONDA MOTOR CO., LTD., Tokyo (JP)

(72) Inventors: Toshimasa Mitsubori, Wako (JP); Kazuhiro Norita, Wako (JP); Takeshi Sugano, Wako (JP); Seiji Hamaoka, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 0 days.

(21) Appl. No.: 14/206,387

(22) Filed: Mar. 12, 2014

(65) Prior Publication Data

US 2014/0290431 A1 Oct. 2, 2014

(30) Foreign Application Priority Data

Mar. 28, 2013 (JP) ................. 2013-068732

(51) Int. Cl.
| | |
|---|---|
| *F16H 37/04* | (2006.01) |
| *F16H 3/00* | (2006.01) |
| *F16H 57/04* | (2010.01) |
| *F16H 57/02* | (2012.01) |

(52) U.S. Cl.
CPC ............ *F16H 37/043* (2013.01); *F16H 3/006* (2013.01); *F16H 57/0449* (2013.01); *F16H 57/0494* (2013.01); *F16H 2057/0203* (2013.01); *F16H 2057/02043* (2013.01); *F16H 2057/02086* (2013.01); *Y10T 74/19023* (2015.01)

(58) Field of Classification Search
CPC ... F16H 3/006; F16H 37/043; F16H 57/0449; F16H 57/00494; F16H 2057/02086; F16H 2057/0203; F16H 2057/02043

USPC ............ 74/664, 665 R, 665 A, 665 B, 606 R, 74/606 A, 605, 325, 337.5, 473.37, 473.24, 74/473.3, 473.31, 473.36
See application file for complete search history.

(56) References Cited

U.S. PATENT DOCUMENTS

| | | | | |
|---|---|---|---|---|
| 4,244,232 | A  * | 1/1981 | Murayama | 74/15.66 |
| 6,443,278 | B1 * | 9/2002 | Hori et al. | 192/3.58 |
| 6,595,078 | B2 * | 7/2003 | Arakawa | 74/337.5 |
| 7,694,597 | B2 * | 4/2010 | Nishi et al. | 74/325 |
| 7,730,800 | B2 * | 6/2010 | Sorani et al. | 74/331 |
| 7,878,085 | B2 * | 2/2011 | Keyaki et al. | 74/337.5 |
| 8,464,681 | B2 * | 6/2013 | Matsuo et al. | 123/179.3 |

FOREIGN PATENT DOCUMENTS

| | | |
|---|---|---|
| JP | 3845155 B | 8/2006 |
| JP | 2010-242829 A | 10/2010 |

* cited by examiner

*Primary Examiner* — William C Joyce
*Assistant Examiner* — Jude Agendia
(74) *Attorney, Agent, or Firm* — Squire Patton Boggs (US) LLP

(57) ABSTRACT

The vehicle driving force transmission structure of a power unit can include a main transmission having a transmission shaft group and parallel to a crankshaft and provided in a crankcase on the side of the crankshaft. The transmission structure can also include a large rotational body provided at an end of the crankshaft, and an auxiliary transmission provided as a separate body from and connecting to the main transmission. The auxiliary transmission has a transmission shaft group parallel to the transmission shaft group of the main transmission and disposed so as to form a periphery of the large rotational body. The auxiliary transmission includes a transmission driving mechanism disposed below the large rotational body.

12 Claims, 10 Drawing Sheets

VEHICLE DRIVING FORCE TRANSMISSION STRUCTURE

BACKGROUND

1. Field

Embodiments of the present invention relate to a vehicle driving force transmission structure in a power unit having an auxiliary transmission of a separate body.

2. Description of Related Art

As a vehicle driving force transmission structure, a vehicle driving force transmission structure is disclosed, for example, in Patent Document 1 (Japanese Patent No. 3845155 (FIGS. 9 and 9)). In the structure, a main transmission having a multi-speed transmission mechanism and so forth and an auxiliary transmission having a forward-reverse switching mechanism and so forth are accommodated in the inside of a crankcase of an internal combustion engine which forms a power unit. Another vehicle driving force transmission structure is disclosed, for example, in Patent Document 2 (Japanese Laid-Open No. 2010-242829 (FIGS. 1 and 2)), which includes an auxiliary transmission of a separate body directly coupled to a crankcase in which a main transmission is accommodated.

Where an auxiliary transmission is provided as a separate body from an internal combustion engine, even if the internal combustion engine itself can be formed in a reduced size, where both transmissions are joined together, there is the possibility that the size may become great. Therefore, further miniaturization of a power unit having an auxiliary transmission is demanded.

SUMMARY

It is a problem to provide, taking the conventional technologies described above into consideration, a vehicle driving force transmission structure which makes it possible, also where an auxiliary transmission is provided as a separate body from an internal combustion engine, to miniaturize a power unit which has the auxiliary transmission.

In order to solve the problem described above, according to certain embodiments of the invention, there is provided a vehicle driving force transmission structure of a power unit. The vehicle driving force transmission structure includes a main transmission having a transmission shaft group parallel to a crankshaft and provided in a crankcase on the side of the crankshaft. The vehicle driving force transmission structure also includes a large rotational body provided at an end of the crankshaft, and an auxiliary transmission provided as a separate body from and connecting to the main transmission. The auxiliary transmission having a transmission shaft group parallel to the transmission shaft group of the main transmission and disposed forming a periphery of the large rotational body. The auxiliary transmission includes a transmission driving mechanism disposed below the large rotational body.

According to certain embodiments the invention, the vehicle driving force transmission structure is configured such that the auxiliary transmission includes a main shaft and an auxiliary shaft at upper and lower positions, respectively. The vehicle driving force transmission structure also includes oil collecting ribs that are provided on an upper inner circumferential face of an auxiliary transmission case corresponding to an end of the main shaft. The vehicle driving force transmission structure further includes fuel supply ports that are provided in the auxiliary transmission case so as to extend from the oil collecting ribs to supporting portions of the main shaft and the auxiliary shaft at the upper and lower positions, respectively.

According to certain embodiments of the invention, the vehicle driving force transmission structure is configured such that an output power shaft is provided on the opposite side of the auxiliary transmission to the transmission driving mechanism with respect to the main shaft and the auxiliary shaft.

According to certain embodiments of the invention, the vehicle driving force transmission structure is configured such that the fuel supply ports positioned at the upper and lower positions are provided in parallel directions same as each other.

According to certain embodiments of the invention, the vehicle driving force transmission structure is configured such that the heightwise position of a bottom of the transmission driving mechanism is substantially the same as the heightwise position of a bottom of an oil pan on the crankcase side.

According to certain embodiments of the invention, the vehicle driving force transmission structure is configured such that an oil port is provided at an upper portion of the auxiliary transmission. An oil level gage which closes up the oil port is provided. A gage tip end of the oil level gage in the state in which the oil port is closed up thereby passes the side of the output power shaft, and is positioned in a recessed portion provided on a bottom inner face of an auxiliary transmission case.

With the vehicle driving force transmission structure of certain embodiments, the auxiliary transmission can be disposed compactly around the crankcase of the power unit together with the transmission driving mechanism thereof. Consequently, miniaturization of the power unit including the auxiliary transmission can be achieved.

With the vehicle driving force transmission structure of certain embodiments of the invention the following effect can be achieved in addition to the effect of the embodiments described above. For example, fuel supply can be carried out by the oil collecting ribs while the main shaft and auxiliary shaft and the transmission driving mechanism are disposed compactly in an L shape around the large rotational body. Therefore, the necessity to dispose an oil pump space in the auxiliary transmission is eliminated, and further miniaturization of the power unit including the auxiliary transmission can be achieved.

With the vehicle driving force transmission structure of certain embodiments of the invention, in addition to the embodiments described above, since the output power shaft is integrated with the auxiliary transmission, compact disposition can be anticipated.

With the vehicle driving force transmission structure of certain embodiments of the invention, in addition to the embodiments described above, reduction of the manufacturing cost can be achieved by enhancement of the machinability.

With the vehicle driving force transmission structure of certain embodiments of the invention, in addition to the effects of the embodiments described above, lower disposition of the center of gravity is achieved while an influence of the power unit including the auxiliary transmission upon the minimum ground clearance is prevented.

With the vehicle driving force transmission structure of certain embodiments of the invention, in addition to the effects of the embodiments described above, the following effects can be achieved. For example, since the oil port is positioned at a high position, the maintenance performance in oiling can be enhanced. Further, since the tip end portion of the oil level gage extending long is positioned in the recessed portion of the bottom inner face of the auxiliary transmission case, movement of the oil level gage can be restricted thereby to prevent the oil level gage from interfering with the output power shaft.

DETAILED DESCRIPTION

In the following, a vehicle driving force transmission structure according to certain embodiments of the present invention is described with reference to FIGS. 1 to 10.

Directions such as forward, rearward, leftward, rightward, upward and downward directions in the description of the present specification and the claims conform to directions of a vehicle (off-road vehicle) in a state in which a power unit including the vehicle driving force transmission structure according to certain embodiments is carried on the vehicle.

Further, in the figures, an arrow mark FR indicates the forward direction of the vehicle; another arrow mark LH the leftward direction of the vehicle; a further arrow mark RH the rightward direction of the vehicle; and a still further arrow mark UP the upward direction of the vehicle.

The "vehicle" in certain embodiments is an off-road vehicle.

A power unit P according to certain embodiments is incorporated in a five-seater off-road vehicle 1 with a roof that can be driven by four wheels.

Figure 1:
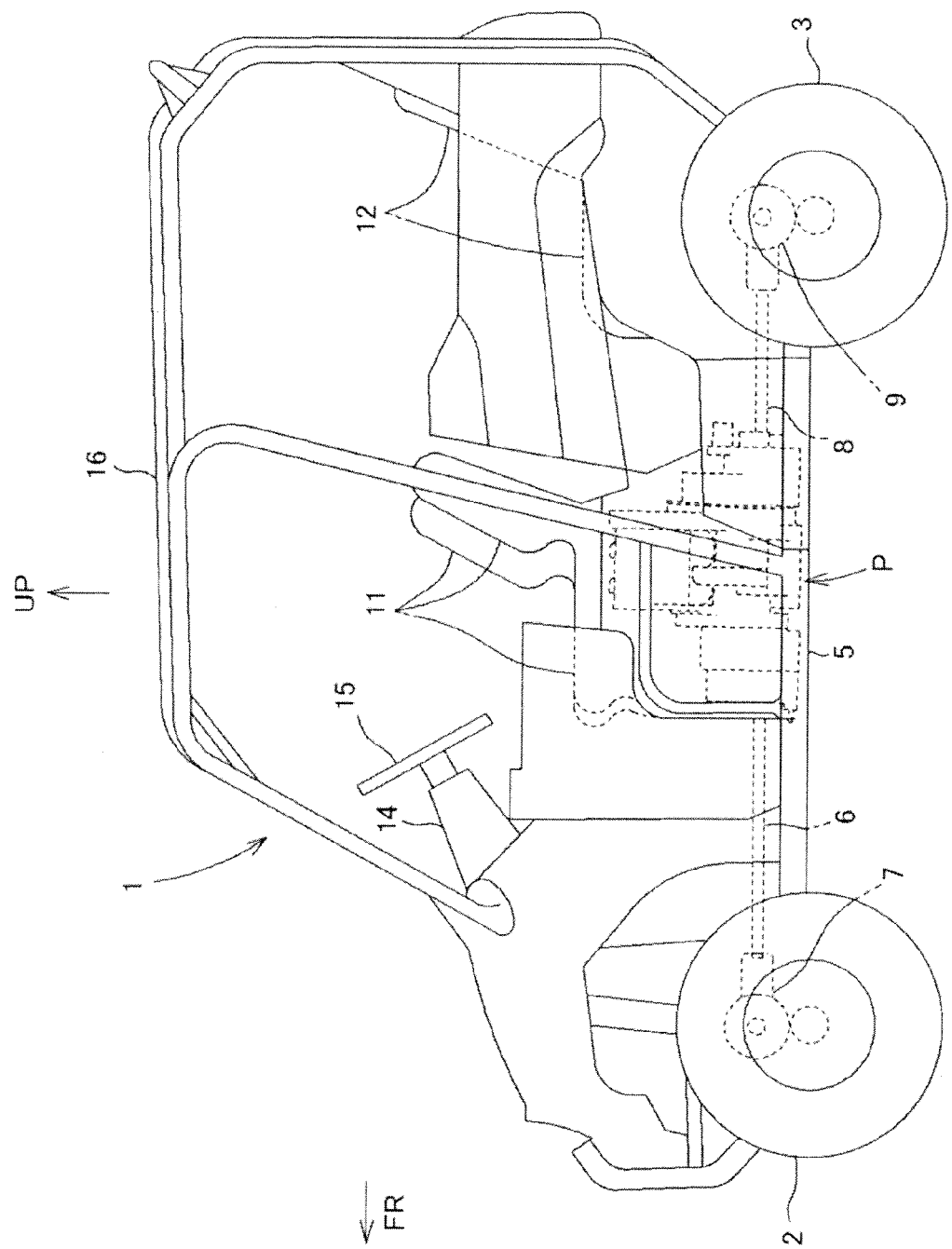
FIG. 1 is a side elevational view of an off-road vehicle in which a power unit having an auxiliary transmission including a vehicle driving force transmission structure according to certain embodiments of the present invention is incorporated.

As shown in FIG. 1, the off-road vehicle 1 includes a pair of left and right front wheels 2 and a pair of left and right rear wheels 3 mounted at front and rear locations respectively of a vehicle body frame 5 and individually having low pressure balloon tires for an uneven terrain.

The power unit P is mounted at a central position of the vehicle body frame 5 in the forward and backward direction such that a crankshaft 21 of an internal combustion engine E is directed in the forward and backward direction. An output power shaft 71 of the power unit P projects forwardly and backwardly. Rotational power of the output power shaft 71 is transmitted from a front end of the output power shaft 71 to the left and right front wheels 2 through a front drive shaft 6 and a front final reduction gear unit 7. Meanwhile, the rotational power of the output power shaft is transmitted from a rear end of the output power shaft 71 to the left and right rear wheels 3 through a rear drive shaft 8 and a rear final reduction gear unit 9.

In certain embodiments a clutch is incorporated in the front final reduction gear unit 7 and carries out engagement or disengagement of power transmission to the front wheels to carry out switching between two-wheel driving and four-wheel driving.

Above the power unit P, three front seats 11 are disposed in a juxtaposed relationship in the leftward and rightward direction. Meanwhile, two left and right rear seats 12 are disposed at a rear location of the vehicle body frame 5.

The central one of the front seats 11 is a driver's seat and is positioned forwardly with respect to the seats on the left and right sides.

A steering wheel 15 is provided in front of the driver's seat such that it projects from a steering column 14.

The front seats 11 and the rear seats 12 are covered from above with a roof 16.

The power unit P carried on the off-road vehicle 1 includes a combination of a main transmission Tm and an auxiliary transmission Ts with the internal combustion engine E, which can be, in certain embodiments, of the water-cooled four-stroke cycle type having two parallel cylinders. A driving force transmission structure 20 is configured over the two transmissions Tm and Ts.

The power unit P is carried on the vehicle body frame 5 in a vertical posture in which the crankshaft 21 of the internal combustion engine E is directed in the forward and backward direction of the vehicle body.

Figure 2:
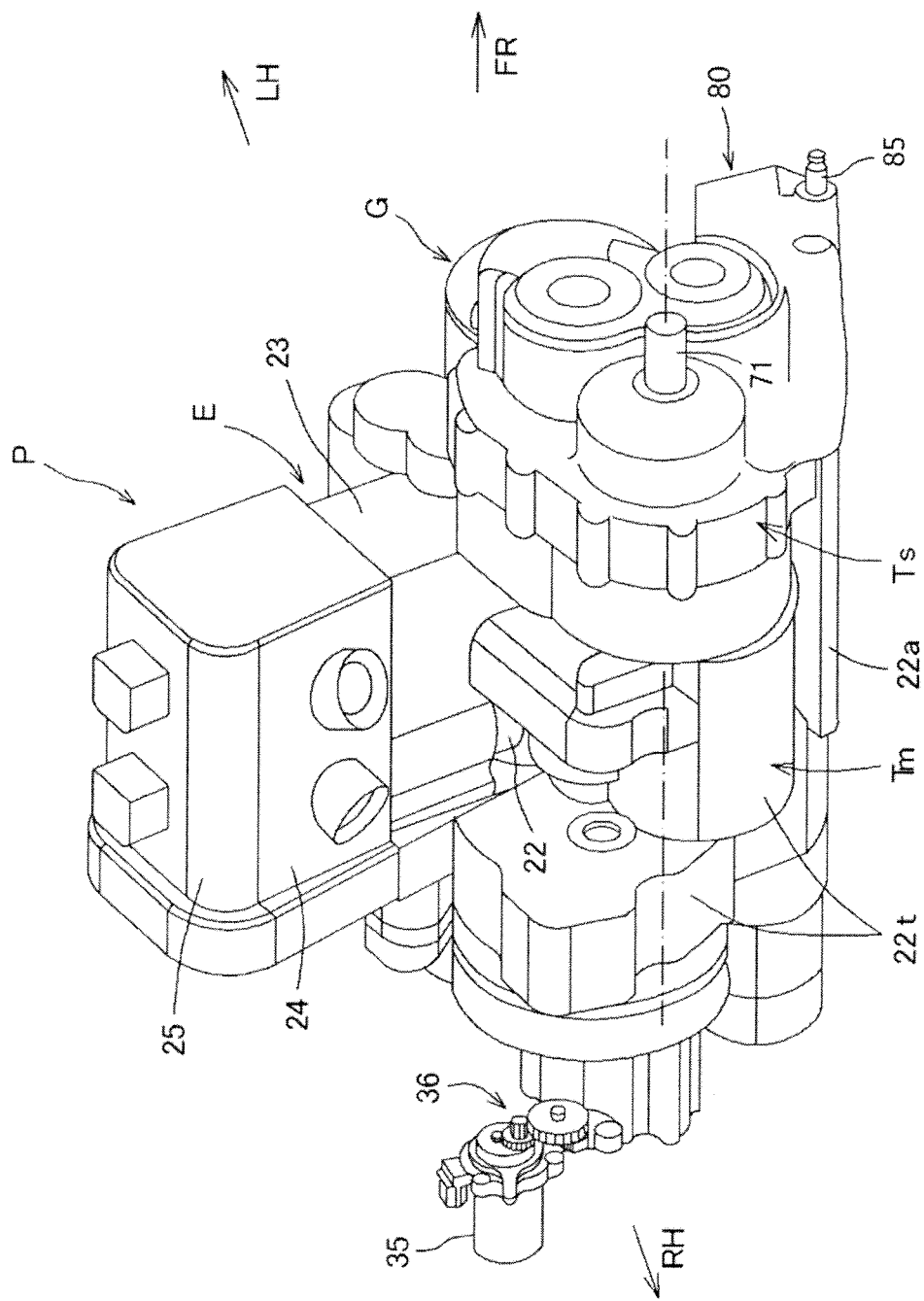
FIG. 2 is a general perspective view of the power unit in certain embodiments.
Figure 3:
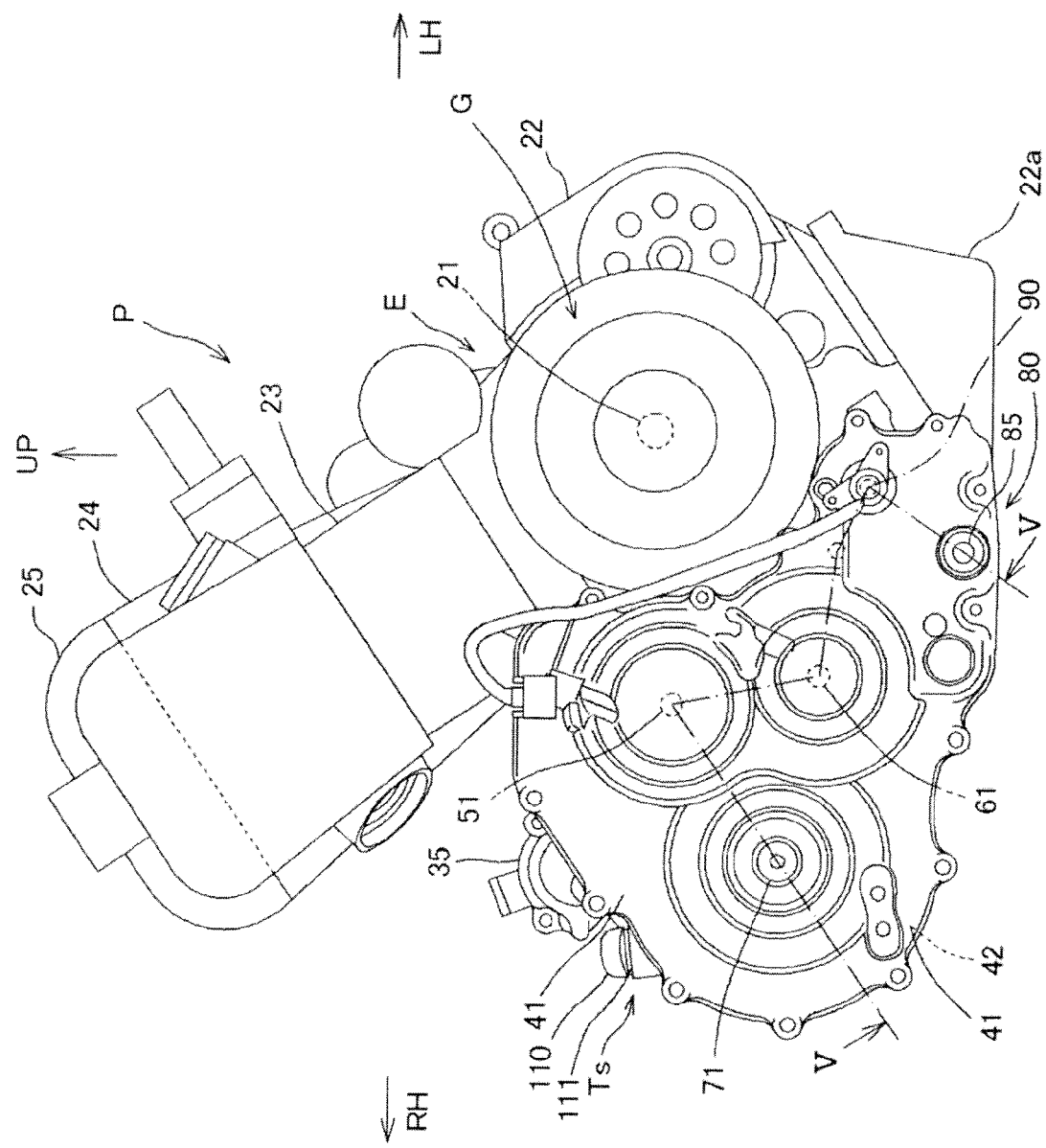
FIG. 3 is a front elevational view of the power unit.

As shown in FIGS. 2 and 3, the power unit P includes a cylinder block 23, a cylinder head 24 and a cylinder head cover 25 placed one on another and projects obliquely rightwardly upwardly of a crankcase 22 which rotatably supports the crankshaft 21 of the internal combustion engine E for rotation.

The crankcase 22 configures a main transmission case 22t which is swollen rightwardly and accommodates the main transmission Tm therein.

The main transmission Tm is positioned on the right side of the crankshaft 21 of the internal combustion engine E, and the auxiliary transmission Ts is provided in a projecting manner in a substantially overlapping relationship with and in front of the main transmission Tm.

Further, in certain embodiments, an AC generator ("large rotating body") G is provided at a front location of the internal combustion engine E. The AC generator G is attached to a front end of the crankshaft 21. The auxiliary transmission Ts is disposed on a right side circumference of the AC generator G. A transmission driving mechanism 80 of the auxiliary transmission Ts hereinafter described is disposed below the AC generator G.

An oil pan 22a is provided at a lower location of the crankcase 22 as shown in FIG. 3. The height of the bottom of the oil pan 22a and the height of the bottom of the transmission driving mechanism 80 are adjusted to each other.

Figure 4:
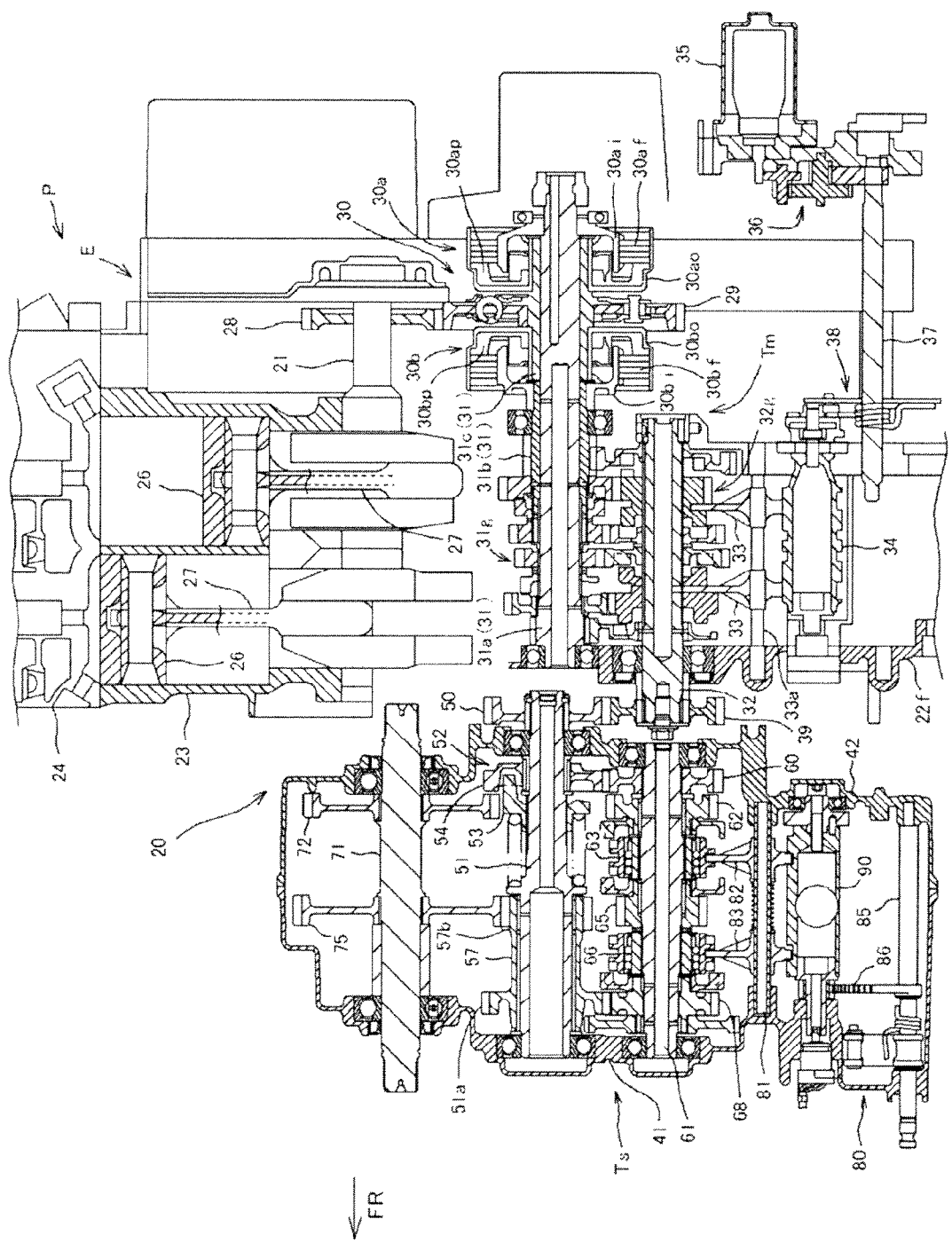
FIG. 4 is a cross sectional view of the power transmission structure showing an entire power transmission system of the power unit.

The driving force transmission structure 20 certain embodiments is generally shown in a cross sectional view of FIG. 4.

Two cylinders are formed in a serially juxtaposed relationship with each other in the forward and backward direction in the cylinder block 23 of the internal combustion engine E. A piston 26 which slidably reciprocates in each cylinder bore and the crankshaft 21 are connected to each other by a connecting rod 27 so that reciprocation of the piston 26 is converted into and outputted as rotation of the crankshaft 21.

A primary driving gear 28 is fitted at a rear end portion of the crankshaft 21 which is directed in the forward and backward direction.

A main shaft 31 of the main transmission Tm is positioned on the right side of the crankshaft 21. The main shaft 31 includes a main shaft inner tube 31a, and a main shaft outer tube 31b and a clutch section outer tube 31c juxtaposed in the leftward and rightward direction and rotatably fitted on an outer periphery of the main shaft inner tube 31a.

Six driving transmission gears 31g are provided on the main shaft 31, and six driven transmission gears 32g are provided on a countershaft 32 in a corresponding relationship to the driving transmission gears 31g and normally held in meshing engagement with driving transmission gears 31g.

The driving transmission gears 31g on odd-numbered gear shift stages are provided on the main shaft inner tube 31a while the even-numbered driving transmission gears 31g are provided on the main shaft outer tube 31b.

A twin clutch 30 is configured from a first clutch 30a and a second clutch 30b and provided on the clutch section outer tube 31c. A primary driven gear 29 is provided at the center of the clutch section outer tube 31c, and clutch outers 30ao and 30bo of the first clutch 30a and second clutch 30b are provided on the opposite sides of the primary driven gear 29. The primary driven gear 29 and the clutch outers 30ao and 30bo are spline-fitted on the clutch section outer tube 31c such that movement thereof in the axial direction is restricted.

The central primary driven gear 29 meshes with the primary driving gear 28 provided on the crankshaft 21.

A clutch inner 30ai of the first clutch 30a is spline-fitted against movement in the axial direction on the main shaft inner tube 31a. A clutch inner 30bi of the second clutch 30b is spline-fitted against movement in the axial direction on the main shaft outer tube 31b.

A friction plate group 30af (30bf) is configured from driving friction plates provided for integral rotation on the clutch outer 30ao (30bo) and driven friction plates provided for integral rotation on the clutch inner 30ai (30bi). The driving friction plates and the driven friction plates are arrayed alternately. The friction plate group 30af (30bf) can be pressed by a pressure plate 30ap (30bp).

A hydraulic circuit is formed in the main shaft inner tube 31a, at rear ends of the clutch section outer tube 31c and the main shaft inner tube 31a and a rear crankcase cover (not shown). The hydraulic circuit selectively drives the pressure plates 30ap and 30bp.

If the pressure plate 30ap is driven to press the friction plate group 30af, then the first clutch 30a is engaged, and power inputted to the primary driven gear is transmitted to the main shaft inner tube 31a to rotate the driving transmission gears 31g of the odd-numbered gear shift stages.

If the pressure plate 30bp is driven to press the friction plate group 30bf, then the second clutch 30b is engaged, and power inputted to the primary driven gear 29 is transmitted to the main shaft outer tube 31b to rotate the driving transmission gears 31g of the even-numbered gear shift stages.

Two of the six driving transmission gears 31g rotatably supported on the main shaft 31 are shifter gears which move in the axial direction. Two of the six driven transmission gears 32g rotatably supported on the countershaft 32 are shifter gears which move in the axial direction.

Shift forks 33 are rotatably supported on a shift fork shaft 33a, and move the two shift gears on the countershaft 32.

Also shift forks 33 for moving the two shift gears on the main shaft 31, and a shift fork shaft, are provided although they are not shown.

Guide grooves formed on an outer circumferential face of a shift drum 34, and the four shift forks 33 are moved under the guidance of the guide grooves by rotation of the shift drum 34 to switch meshing engagement of a gear to which power is to be transmitted effectively.

The shift drum 34 is rotated by a shifting motor 35.

The driving force of the shifting motor 35 is transmitted as rotation to a shift spindle 37 through a speed reduction gear mechanism 36, and the rotation of the shift spindle 37 is transmitted as rotation to the shift drum 34 through an intermittent feeding mechanism 38.

Accordingly, the main transmission Tm can smoothly switch the gear shift stages among the first to sixth shift speeds through hydraulic pressure control of the twin clutch 30 and driving control of the shifting motor 35 to change the gear or the speed.

The output power shaft of the main transmission Tm is the countershaft 32. The countershaft 32 extends forwardly through a front side wall 22f of the crankcase 22, and a main transmission output power gear 39 is fixed at a projecting front end of the countershaft 22.

In the power unit P in certain embodiments, the auxiliary transmission Ts is provided in front of the main transmission Tm to form the driving force transmission structure 20.

In particular, the main transmission Tm has the main shaft 31 and the countershaft 32 which form a transmission shaft group parallel to the crankshaft 21 and is provided on the right side of the crankshaft 21 in the crankcase 22. However, the auxiliary transmission Ts connecting to the main transmission Tm is provided as a separate body. The auxiliary transmission Ts includes a main shaft 51, an auxiliary shaft 61 and an output power shaft 71 which form a transmission shaft group serial to the transmission group 31 and 32 of the main transmission Tm. The auxiliary transmission Ts is disposed such that it serves as a periphery of the AC generator G which is a large rotational body provided at a front end of the crankshaft 21.

The auxiliary transmission Ts is configured in the inside of a front side auxiliary transmission case 41 and a rear side auxiliary transmission case 42 formed as front and rear members united with each other.

The auxiliary transmission Ts includes a cam type torque damper 52.

Figure 5:
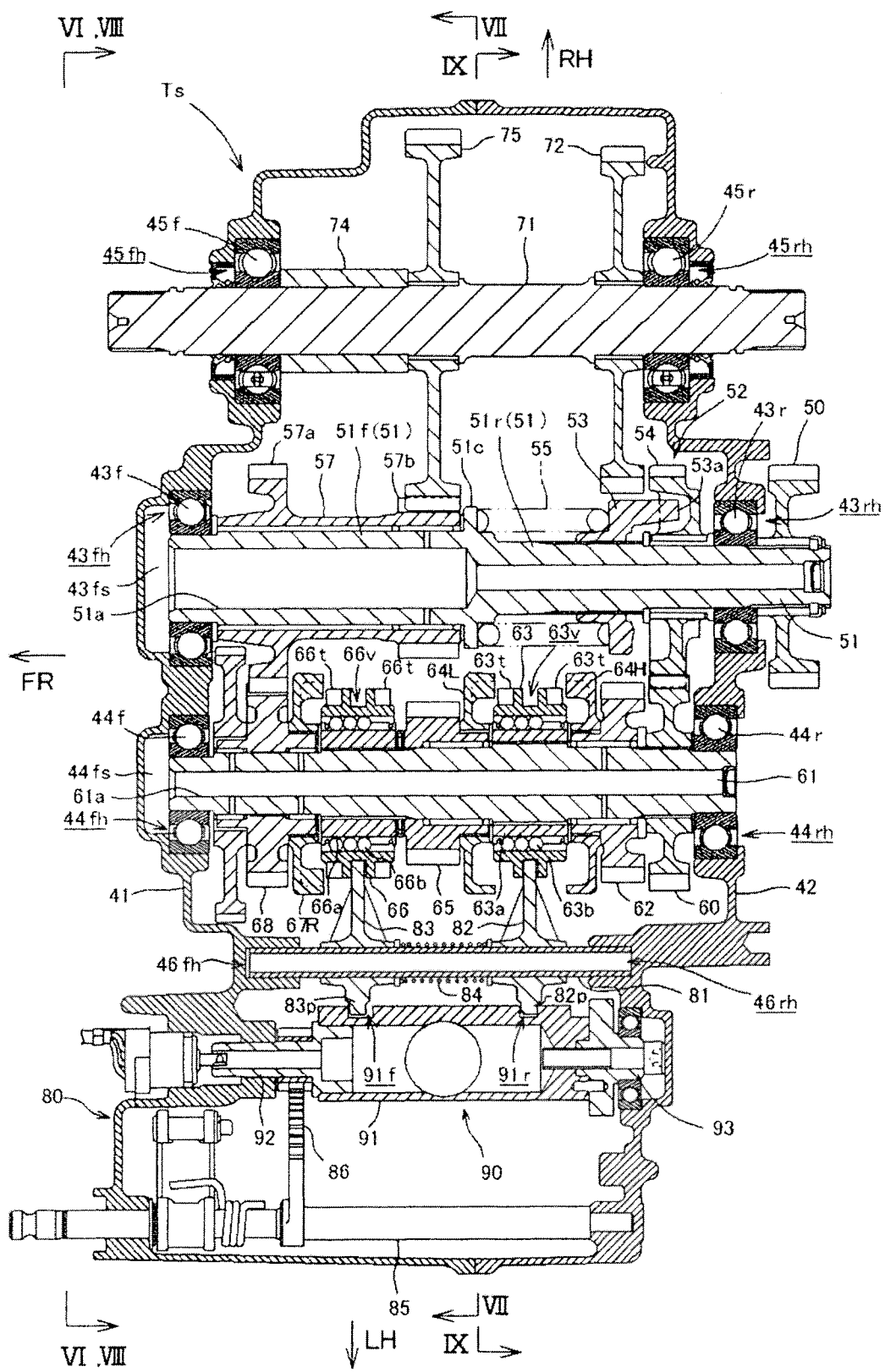
FIG. 5 is a cross sectional exploded view of the auxiliary transmission taken along line V-V in FIGS. 3 and 6.
Figure 6:
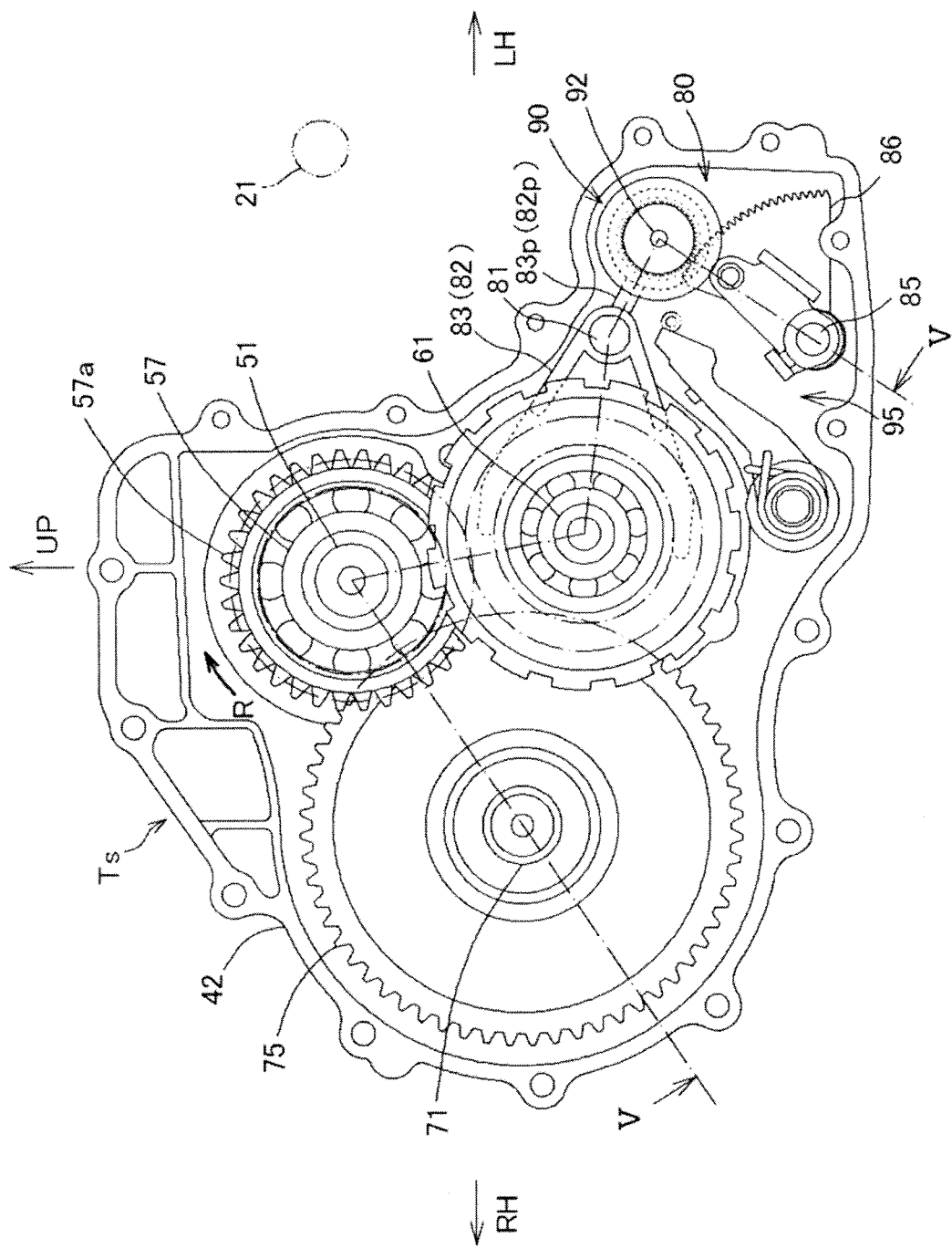
FIG. 6 is a front elevational view of the auxiliary transmission taken along line VI-VI in FIG. 5 with a front side auxiliary transmission case removed.

FIG. 5 is a cross sectional view showing a structure of the auxiliary transmission Ts taken along line V-V in FIGS. 3 and 6.

The rotational support shafts of the auxiliary transmission Ts including the auxiliary shaft 61 of the auxiliary transmission Ts, output power shaft 71 of the auxiliary transmission Ts, main shaft 51 and so forth are rotatably supported at front and rear ends thereof on the front side auxiliary transmission case 41 and the rear side auxiliary transmission case 42. The rotational shafts extend in parallel to the crankshaft 21 and are directed in the forward and backward directions. The auxiliary shaft 61 is a transmission driving shaft for causing the transmission gears of the auxiliary transmission Ts to mesh with each other. The output power shaft 71 serves as a transmission driven shaft and is the output power shaft of the auxiliary transmission Ts. The main shaft 51 serves as an input shaft of the auxiliary transmission Ts and supports the cam type torque damper 52.

The main shaft 51 corresponds to the input shaft of the auxiliary transmission Ts and is disposed at an upper location of the center of the auxiliary transmission Ts in the leftward and rightward widthwise direction (refer to FIG. 6). As shown in FIG. 5, a front side main shaft 51f on the front side with respect to a central flange 51c has an outer diameter greater than a rear side main shaft 51r. The front side main shaft 51f is rotatably supported at a front end thereof by a bearing 43f fitted in a bearing recessed portion 43fh of the front side auxiliary transmission case 41. Meanwhile, the rear side main shaft 51r is rotatably supported at a rear portion thereof by a bearing 43r fitted in a bearing hole 43rh of the rear side auxiliary transmission case 42. Consequently, the main shaft 51 is rotatably provided.

The rear side main shaft 51r extends through the bearing 43r and projects rearwardly. An auxiliary transmission input gear 50 is fitted at a projecting rear end portion of the rear side main shaft 51r.

The auxiliary transmission input gear 50 meshes with the main transmission output power gear 39 so that output power of the main transmission Tm is inputted to the auxiliary transmission input gear 50 of the auxiliary transmission Ts.

The cam type torque damper 52 is provided on the rear side main shaft 51r.

A cam member 53 is spline-fitted on the rear side main shaft 51r such that relative rotation of them is restricted while movement in the axial direction is permitted. A cam follower gear member 54 is provided behind and in an opposing relationship to the cam member 53 such that movement thereof in the axial direction is restricted while relative rotation is permitted.

The cam member 53 has a cam projection 53a formed thereon in a projecting manner toward the cam follower gear member 54 and having an inclined cam face.

The cam follower gear member 54 has a recessed portion for contacting with the cam face of the cam projection 53a of the cam member 53 and has a gear formed on an outer circumferential portion thereof.

A coil spring 55 is interposed between the cam member 53 and the main shaft 51 and biases the cam member 53 rearwardly toward the cam follower gear member 54 so that the cam face of the cam projection 53a of the cam member 53 contacts with the recessed portion of the cam follower gear member 54.

Accordingly, even in such a case that torque inputted from the auxiliary transmission input gear 50 to the main shaft 51 increases or decreases suddenly, a buffering action acts between the cam member 53 and the cam follower gear member 54 of the cam type torque damper 52. Consequently, the influence of the increase or decrease of the torque upon the transmission mechanism on the downstream side of the cam follower gear member 54 is suppressed, and therefore, speed change or gear change can be carried out smoothly.

An intermediate cylindrical gear member 57 is rotatably supported on the front side main shaft 51f.

A large diameter idle gear 57a and a small diameter idle gear 57b are formed integrally at front and rear locations on the intermediate cylindrical gear member 57.

The auxiliary shaft 61 from between the auxiliary shaft 61 as the transmission driving shaft and the output power shaft 71 as the transmission driven shaft which cause the transmission gears of the auxiliary transmission Ts to mesh with each other, is disposed in parallel to the main shaft 51 at a position below and same as the position of the main shaft 51 in the axial direction (refer to FIGS. 5 and 6).

As shown in FIG. 5, the auxiliary shaft 61 is rotatably supported at a front end thereof by a bearing 44f fitted in a bearing recessed portion 44fh of the front side auxiliary transmission case 41. The auxiliary shaft 61 is rotatably supported at a rear end thereof by a bearing 44r fitted in a bearing hole 44rh of the rear side auxiliary transmission case 42. Thus, the auxiliary shaft 61 is rotatably provided.

A driving shaft input gear 60 is spline-fitted at a fixed position of a rear portion of the auxiliary shaft 61 along the bearing 44r. The driving shaft input gear 60 meshes with the cam follower gear member 54 rotatably supported on the main shaft 51 so that power through the cam type torque damper 52 is inputted to the auxiliary shaft 61.

A high speed driving gear 62 is rotatably supported on the auxiliary shaft 61 adjacent to and on the front side of the driving shaft input gear 60 at a rear location, and a low speed driving gear 65 is rotatably supported at a central location of the auxiliary shaft 61. Further, a reverse driving gear 68 is rotatably supported at a front portion of the auxiliary shaft 61.

A high-low speed changeover clutch mechanism including a high-low speed switching shifter member 63 is provided between the high speed driving gear 62 and the low speed driving gear 65.

The high-low speed switching shifter member 63 has a cylindrical base portion 63a spline-coupled to a predetermined position of the auxiliary shaft 61 in the axial direction of the auxiliary shaft 61. The high-low speed switching shifter member 63 is rotatably and movably supported in the axial direction on an outer periphery of the cylindrical base portion 63a through a linear motion bearing 63b. The high-low speed switching shifter member 63 has clutch teeth 63t formed thereon so as to be directed to the forward and backward opposite sides and a shift fork groove 63v formed between the clutch teeth 63t.

A clutch receiving member 64H is fitted on the high speed driving gear 62 in an opposing relationship to the clutch teeth 63t on the rear side while a clutch receiving member 64L is fitted on the low speed driving gear 65 in an opposing relationship to the clutch teeth 63t on the front side.

Accordingly, if the high-low speed switching shifter member 63 moves rearwardly, then the clutch teeth 63t on the rear side are brought into meshing engagement with the clutch receiving member 64H fitted on the high speed driving gear 62 to rotate the high speed driving gear 62 together with the auxiliary shaft 61.

If the high-low speed switching shifter member moves forwardly, then the clutch teeth 63t on the front side are brought into meshing engagement with the clutch receiving member 64L fitted on the low speed driving gear 64 to rotate the low speed driving gear 64 together with the auxiliary shaft 61.

If the high-low speed switching shifter member is positioned centrally between the clutch receiving members 64H and 64L without meshing with any of them, then rotation of the auxiliary shaft 61 is not transmitted to any of the high speed driving gear 62 and the low speed driving gear 64.

In certain embodiments, forward-backward switching clutch mechanism including a forward-backward switching shifter member 66 is provided between the low speed driving gear 65 and the reverse driving gear 68.

The forward-backward switching shifter member 66 has a cylindrical base portion 66a spline-coupled to a predetermined position of the auxiliary shaft 61 in the axial direction similarly to the high-low speed switching shifter member 63. The forward-backward switching shifter member 66 is rotatably and movably supported on an outer periphery of the cylindrical base portion 66a in the axial direction through a linear motion bearing 66b. A shift fork groove 66v is formed on the forward-backward switching shifter member 66 between clutch teeth 66t formed toward the opposite front and rear sides.

A clutch receiving member 67R is fitted on the reverse driving gear 68 in an opposing relationship to the clutch teeth 66t on the front side of the forward-backward switching shifter member 66.

The clutch teeth 66t on the rear side of the forward-backward switching shifter member 66 do not have a counterpart for meshing engagement.

Accordingly, if the forward-backward switching shifter member 66 is positioned at a rear position, then the clutch teeth 66t on the rear side do not have a counterpart for meshing engagement. Therefore, rotation of the auxiliary shaft 61 is not transmitted through the forward-backward switching shifter member 66 but is transmitted only to the high speed driving gear 62 or the low speed driving gear 65 for forward traveling through the high-low speed switching shifter member 63.

If the forward-backward switching shifter member 66 is moved to a front position, then the clutch teeth 66t on the front side are brought into meshing engagement with the clutch receiving member 67R fitted on the reverse driving gear 68. Consequently, the reverse driving gear 68 is rotated together with the auxiliary shaft 61.

The reverse driving gear 68 is held in meshing engagement with the large diameter idle gear 57a of the intermediate cylindrical gear member 57 relatively rotatably supported on the main shaft 51.

As shown in FIGS. 3 and 6, on the right side (left side in the front elevations of FIGS. 3 and 6) of the main shaft 51 and the auxiliary shaft 61 disposed at upper and lower positions at the center of the auxiliary transmission Ts in the leftward and rightward widthwise direction, the output power shaft 71 as a transmission driven shaft is disposed in parallel to the auxiliary shaft 61 as a transmission driving shaft.

As shown in FIG. 5, the output power shaft 71 extends through and is rotatably supported at a front portion thereof on a bearing 45f fitted in a bearing hole 45fh of the front side auxiliary transmission case 41. The output power shaft 71 extends through and is rotatably supported at a rear portion thereof on a bearing 45r fitted in a bearing hole 45rh of the rear side auxiliary transmission case 42. The output power shaft 71 projects at front and rear ends thereof forwardly and rearwardly and is mounted for rotation.

A high speed driven gear 72 is spline-fitted at a predetermined position with a rear portion of the output power shaft 71 along the bearing 45r. A low speed driven gear 75 is spline-fitted at a predetermined position with a central portion of the output power shaft 71, and a collar member 74 is interposed between the low speed driven gear 75 and the bearing 45f on the front side.

Accordingly, the high speed driven gear 72 and the low speed driven gear 75 rotate integrally with the output power shaft 71 at the respective predetermined positions in the axial direction.

The high speed driven gear 72 and the low speed driven gear 75 normally mesh with the high speed driving gear 62 and the low speed driving gear 65 rotatably supported on the auxiliary shaft 61, respectively.

The low speed driven gear 75 meshes also with the small diameter idle gear 57b of the intermediate cylindrical gear member 57 rotatably supported on the main shaft 51.

Accordingly, rotation of the reverse driving gear 68 on the auxiliary shaft 61 is transmitted to the low speed driven gear 75 through the large diameter idle gear 57a and the small diameter idle gear 57b of the intermediate cylindrical gear member 57 on the main shaft 51 with the direction thereof reversed. Consequently, the output power shaft 71 can be rotated in the rearwardly traveling direction.

The output power shaft 71 extends forwardly and rearwardly through the front side auxiliary transmission case 41 and the rear side auxiliary transmission case 42 of the auxiliary transmission Ts and projects forwardly and rearwardly at front and rear ends thereof. The output power shaft 71 is an output power shaft of the auxiliary transmission Ts and also is the output power shaft 71 of the power unit P.

In particular, the output power shaft 71 is connected at a front end thereof to the front drive shaft 6 and at a rear end thereof to the rear drive shaft 8 so that power is transmitted to the front wheels 2 and the rear wheels 3 (refer to FIG. 1).

The transmission driving mechanism 80 for moving the high-low speed switching shifter member 63 and the forward-backward switching shifter member 66 on the auxiliary shaft 61 in the axial direction is provided on the left side of the auxiliary shaft 61 (right side in FIG. 6), namely, on the crankshaft 21 side.

As shown in FIG. 6, the transmission driving mechanism 80 includes a shift spindle 85 for being operated manually, a shift drum 90, shift forks 82 and 83 and so forth. The shift drum 90 is driven to rotate through a gear shift arm 86 of the shift spindle 85. The shift forks 82 and 83 are moved in the axial direction by rotation of the shift drum 90. The high-low speed switching shifter member 63 is operated by the shift fork 82, and the forward-backward switching shifter member 66 is operated by the shift fork 83. Further, a parking mechanism 95 is provided.

The transmission driving mechanism 80 itself is a widely known mechanism, and therefore, detailed description thereof is omitted herein.

A shift fork shaft 81 extends through the shift fork 82 and the shift fork 83 and slidably and rotatably supports them in the axial direction. The shift fork 82 is fitted in a shift fork groove 63v of the high-low speed switching shifter member 63, and the shift fork 83 is fitted in the shift fork groove 66v of the forward-backward switching shifter member 66. The shift fork shaft 81 is fitted at front and rear ends thereof in shaft holes 46fh and 46rh of the front side auxiliary transmission case 41 and the rear side auxiliary transmission case 42, respectively.

A coil spring 84 is interposed between the front shift fork 83 and the rear shift fork 82 and biases the shift fork 82 and the shift fork 83 away from each other. The coil spring 84 makes meshing engagement between the clutch teeth of the shifter members 63 and 66, which are smoothly moved by the shift forks 82 and 83, respectively.

The shift drum 90 is provided on the further left side of the shift fork shaft 81.

The shift drum 90 includes a cylindrical drum main body 91 and drum supporting shafts 92 and 92 provided on the center axis at the opposite front and rear ends of the drum main body 91 such that they project forwardly and rearwardly from the drum main body 91.

Guide grooves 91f and 91r are formed on an outer peripheral face of the main shaft 51 and have required shapes in a circumferential direction. Engaging pin portions 82p and 83p are formed on the front and rear shift forks 82 and 83 such that they project in the same direction and slidably engage with the guide grooves 91f and 91r, respectively. Consequently, the shift forks 82 and 83 are moved in the axial direction by rotation of the shift drum 90 under the guidance of the guide grooves 91*f* and 91*r* to move the high-low speed switching shifter member 63 and the forward-backward switching shifter member 66 thereby to carry out speed change or gear change, respectively.

The shift drum 90 is driven by manual rotation of a shift spindle 85 to rotate through a gear shift arm 86 thereof.

In the reverse state, by rotation of the shift drum 90, the forward-backward switching shifter member 66 is brought into meshing engagement with the clutch receiving member 67R and transmits rotation of the auxiliary shaft 61 to the reverse driving gear 68. The rotation is transmitted also to the large diameter idle gear 57*a* meshing with the reverse driving gear 68 and the intermediate cylindrical gear member 57 integral with the large diameter idle gear 57*a* and then to the small diameter idle gear 57*b* and also to the low speed driven gear 75 meshing with the small diameter idle gear 57*b*. Consequently, the rotation is transmitted as reverse rotation to the output power shaft 71 through the intermediate cylindrical gear member 57.

In a low speed forwardly traveling state, the shift drum 90 rotates, and the shift forks 82 and 83 are guided by the guide grooves 91*f* and 91*r* of the shift drum 90, respectively, to move the high-low speed switching shifter member 63 forwardly in the axial direction until it is brought into meshing engagement with the clutch receiving member 64L. Consequently, the rotation of the auxiliary shaft 61 is transmitted to the low speed driving gear 65. Further, the rotation is transmitted to the low speed driven gear 75 meshing with the low speed driving gear 65 and to the output power shaft 71. Consequently, a low speed forwardly traveling state is established.

In the low speed forwardly traveling state of certain embodiments, the forward-backward switching shifter member 66 is not in mesh with the clutch receiving member 67R.

In a high speed forwardly traveling state, the shift fork 82 is guided by the guide groove 91*r* by rotation of the shift drum 90 to move the high-low speed switching shifter member 63 rearwardly in the axial direction until the high-low speed switching shifter member 63 is brought into meshing engagement with the clutch receiving member 64H. Consequently, rotation of the auxiliary shaft 61 is transmitted to the high speed driving gear 62. The rotation is further transmitted to the high speed driven gear 72 meshing with the high speed driving gear 62 and to the output power shaft 71. Consequently, a high speed forwardly traveling state is established.

In the high speed forwardly traveling state of certain embodiments, the forward-backward switching shifter member 66 is not in mesh with the clutch receiving member 67R.

The auxiliary transmission Ts carries out such speed change operations as described above by manual operation thereof.

The high speed forwardly traveling state in certain embodiments is used for two-wheel driving whereas the low speed forwardly traveling state and the rearwardly traveling state are used for four-wheel driving.

In particular, in certain embodiments, as shown in FIGS. 2, 3 and 4, the main transmission Tm having the main shaft 31 and the countershaft 32 parallel to the crankshaft 21 is provided in the crankcase 22 on the right side of the crankshaft 21. The AC generator G, which is a large size rotational body, is provided at a front end of the crankshaft 21, and the auxiliary transmission Ts as a separate body connecting to the main transmission Tm is provided. The auxiliary transmission Ts has the main shaft 51, auxiliary shaft 61 and output power shaft 71 parallel to the main shaft 31 and the countershaft 32 of the main transmission Tm and is disposed so as to form a periphery of the AC generator G. The transmission driving mechanism 80 of the auxiliary transmission Ts is disposed below the AC generator G.

Therefore, the auxiliary transmission Ts can be disposed compactly around the crankcase 22 of the power unit P together with the transmission driving mechanism 80 thereof, and miniaturization of the power unit P including the auxiliary transmission Ts is achieved.

Further, in certain embodiments, the transmission driving mechanism 80 of the auxiliary transmission Ts is disposed below the AC generator G. The auxiliary transmission Ts includes the main shaft 51 and the auxiliary shaft 61 at upper and lower locations as shown in FIG. 7 which shows the inner face of the front side auxiliary transmission case 41.

Further, oil collecting ribs 101 and 102 are provided on the upper inner circumferential face 41*a* of the front side auxiliary transmission case 41 corresponding to the front side end of the main shaft 51.

Figure 7:
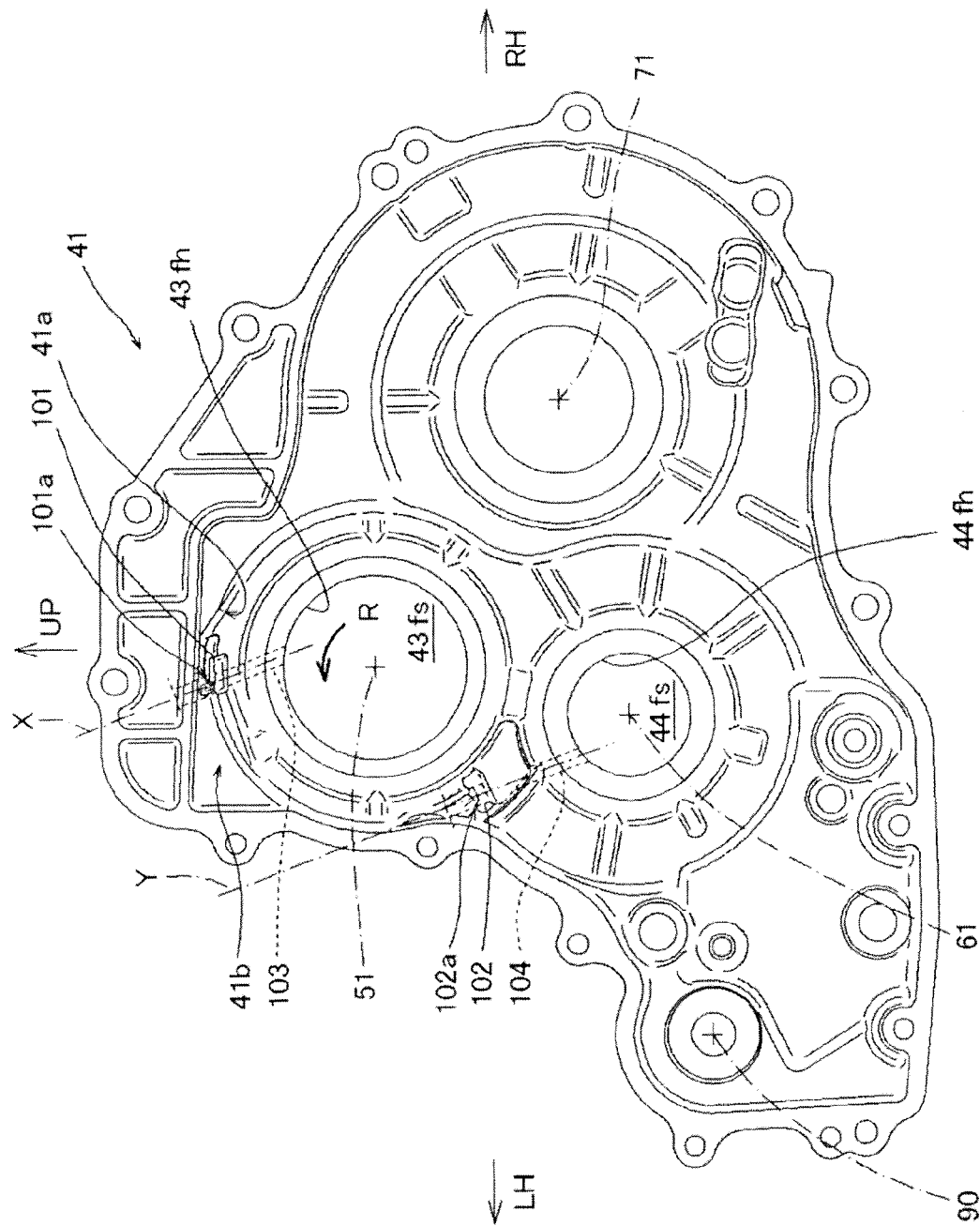
FIG. 7 is a rear elevational view (inside view) of the front side auxiliary transmission case of the auxiliary transmission taken along line VII-VII in FIG. 5.

In particular, the oil collecting ribs 101 and 102 are provided in a direction in which they receive lubricating oil which is scattered with a rotational component by rotation of the main shaft 51 or flows along the upper inner circumferential face 41*a* in the rotational direction R (in the present embodiment, in the counterclockwise direction in FIG. 7) of the main shaft 51.

The oil collecting rib 101 is disposed substantially just above the main shaft 51 and may suitably extend rearwardly in the axial direction from a front end of the upper inner circumferential face 41*a*. However, the oil collecting rib 101 is formed as a groove in the axial direction so that the lubricating oil caught thereby can be guided to the front end.

The oil collecting rib 102 is formed forwardly by approximately one third rotation in the rotational direction R of the main shaft 51 from the oil collecting rib 101.

A recessed portion 101*a* of the oil collecting rib 101 on the oil receiving side is open to and communicated with an upper side fuel supply port 103 ("fuel supply port" in the present invention) perforated in the inside of a front wall portion 41*b* of the front side auxiliary transmission case 41. The upper side fuel supply port 103 is open and communicated at a lower end thereof to and with a shaft end space 43*fs* of the bearing recessed portion ("supporting portion" in the present embodiment) 43*fh* which supports the main shaft 51.

Accordingly, lubricating oil collected by the oil collecting rib 101 is supplied into the shaft end space 43*fs* of the bearing recessed portion 43*fh* of the main shaft 51 through the upper side fuel supply port 103 and is used for lubrication of a required location around the main shaft 51 further through a hollow hole 51*a* in the main shaft 51.

A recessed portion 102*a* of the oil collecting rib 102 on the oil receiving side is open to and communicated with a lower side fuel supply port ("fuel supply port" in the present embodiment) 104 perforated in the inside of the front wall portion 41*b* of the front side auxiliary transmission case 41. The lower side fuel supply port 104 is open and communicated at a lower end thereof to and with a shaft end space 44*fs* of the bearing recessed portion ("supporting portion" in the present invention) 44*fh* which supports the auxiliary shaft 61.

Accordingly, lubricating oil collected by the oil collecting rib 102 is supplied into the shaft end space 44*fs* of the bearing recessed portion 44*fh* of the auxiliary shaft 61 through the lower side fuel supply port 104 and is used for lubrication of a required location around the auxiliary shaft 61 further through a hollow hole 61*a* in the auxiliary shaft 61.

As a result, while the main shaft 51 and auxiliary shaft 61 and the transmission driving mechanism are disposed compactly in an L shape around the AC generator G, oil supply is carried out by the oil collecting ribs 101 and 102. Therefore, the necessity for disposing an oil pump space in the auxiliary transmission Ts is eliminated, and further miniaturization of the power unit P having the auxiliary transmission Ts is achieved.

Figure 8:
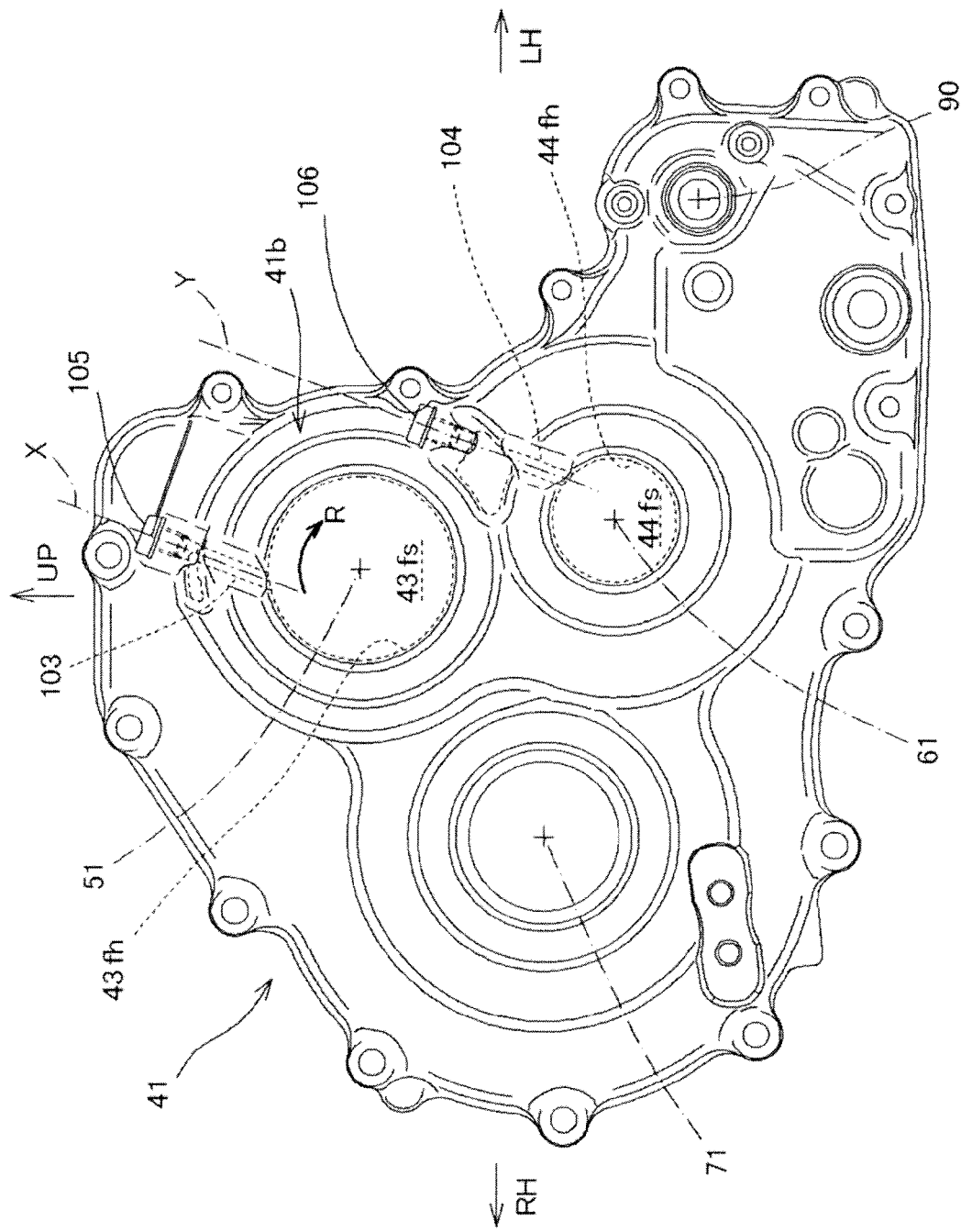
FIG. 8 is a front elevational view (outside view) of the front side auxiliary transmission case of the auxiliary transmission taken along line VIII-VIII in FIG. 5.

Further, as shown in FIG. 8, which is a front elevational view (exterior view) of the front side auxiliary transmission case 41, the upper side fuel supply port 103 is perforated in a rather oblique direction X from an outer face of an upper portion of the front wall portion 41b of the front side auxiliary transmission case 41 to the inner side of the front wall portion 41b toward the shaft end space 43fs of the main shaft 51 and is closed up by a stopper bolt 105.

By the same token, the lower side fuel supply port 104 is perforated in a rather oblique direction Y from an outer face of an upper portion of the front wall portion 41b of the front side auxiliary transmission case 41 to the inner side of the front wall portion 41b toward the shaft end space 44fs of the auxiliary shaft 61 and is closed up by a stopper bolt 106.

The perforation direction X of the upper side fuel supply port 103 and the perforation direction Y of the lower side fuel supply port 104 are the same as each other.

In other words, the upper and lower side fuel supply ports 103 and 104 positioned at upper and lower positions are provided in the same parallel directions as each other, and therefore, reduction of the manufacturing cost by enhancement of the machinability is anticipated.

Further, in certain embodiments, as shown in FIGS. 3 and 6, the output power shaft 71 is provided on the opposite side to the transmission driving mechanism 80 with respect to the main shaft 51 and the auxiliary shaft 61 of the auxiliary transmission Ts. Therefore, the output power shaft 71 can be integrated with the auxiliary transmission Ts and disposed compactly.

Further, as described hereinabove with reference to FIG. 3, the heightwise position of the bottom of the transmission driving mechanism 80 and the heightwise position of the bottom of the oil pan 22a of the crankcase 22 side are same as each other. Therefore, lower disposition of the center of gravity is achieved while an influence of the power unit P having the auxiliary transmission Ts upon the minimum ground clearance is prevented.

Figure 9:
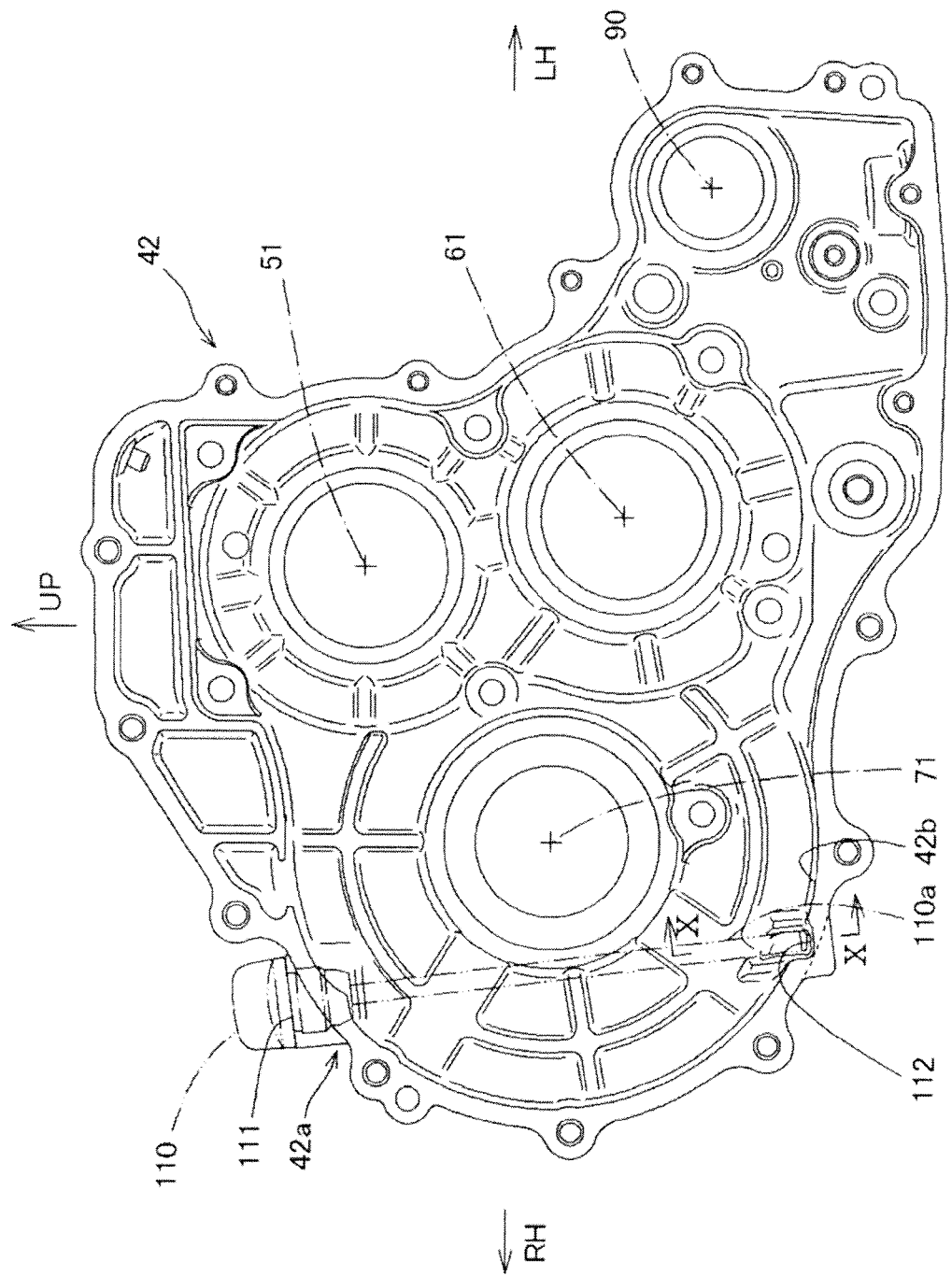
FIG. 9 is a front elevational view (inside view) of a rear side auxiliary transmission case of the auxiliary transmission taken along line IX-IX in FIG. 5.

As shown in FIG. 9, in certain embodiments, an oil port 111 is provided at an upper portion 42a of the rear side auxiliary transmission case 42 such that it is closed up with an oil level gage 110 screwed therein. A recessed portion 112 is provided on a bottom inner face 42b of the rear side auxiliary transmission case 42 on an extension line of the axial line of the oil port 111.

In other words, a gage tip end 110a of the oil level gage 110 in a state in which it closes up the oil port 111 is formed such that it passes the right side of the output power shaft 71 and is positioned in the recessed portion 112 provided on the bottom inner face 42b of the rear side auxiliary transmission case 42.

Figure 10:
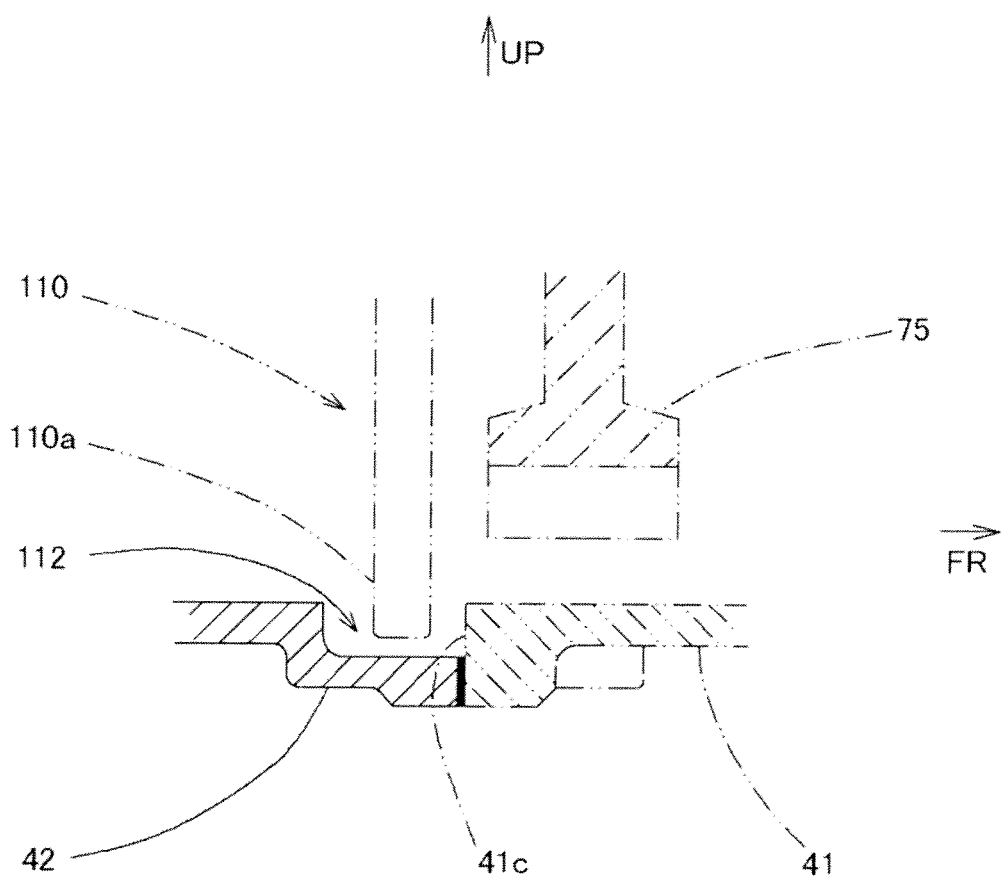
FIG. 10 is a schematic cross sectional view taken along line X-X in FIG. 9 and illustrating a positional relationship between a recessed portion of the rear side auxiliary transmission case and a tip end of an oil level gage positioned in the recessed portion and between the front side auxiliary transmission case and a low speed driven gear in the front side auxiliary transmission case.

As shown in FIG. 10, which is a schematic cross sectional view taken along line X-X in FIG. 9, in the state described, the gage tip end 110a of the oil level gage 110 positioned in the recessed portion 112 of the rear side auxiliary transmission case 42 is restricted also against forward movement by a mating face 41c of the front side auxiliary transmission case 41 fastened to the rear side auxiliary transmission case 42. Therefore, the oil level gage 110 is prevented also from interfering with the low speed driven gear 75 in the front side auxiliary transmission case 41 fitted on the output power shaft 71.

Accordingly, since the oil port 111 is positioned at a high position, the maintenance performance in oiling is enhanced. Further, since the gage tip end 110a of the oil level gage 110 extending long is positioned in the recessed portion 112 of the bottom inner face 42b of the auxiliary transmission Ts, movement of the oil level gage 110 is restricted thereby to prevent the oil level gage 110 from interfering with the output power shaft 71.

Although certain embodiments of the present invention has been described, the mode of the present invention is not limited to the embodiments described above, but includes various forms in which the present invention is carried out in various modes without departing from the subject matter of the present invention.

For example, the vehicle of certain embodiments of the present invention is not limited to the off-road vehicle, but can be applied to a variety of vehicles. Further, the power unit which includes the vehicle driving force transmission structure of certain embodiments of the present invention may be any power unit which includes the requirements of claim 1, and the internal combustion engine included in the power unit may be of any of the air-cooled type and the water-cooled type and may have any number of cylinders. Also where the AC generator in certain embodiments is provided as a large size rotational body provided at an end of a crankshaft, other embodiments may exhibit similar effects.

Further, while the left-right disposition of the components is described in regard to that specified in the drawings for the convenience of description, also a left-right disposition of the components opposite to that of certain embodiments may be included in the present invention.

DESCRIPTION OF REFERENCE SYMBOLS

1 . . . Off-road vehicle ("vehicle" in the present invention), 5 . . . Vehicle body frame, 20 . . . Driving force transmission structure, 21 . . . Crankshaft, 22 . . . Crankcase, 22a . . . Oil pan, 23 . . . Cylinder block, 24 . . . Cylinder head, 30 . . . Twin clutch, 31 . . . Main shaft, 32 . . . Countershaft, 39 . . . Main transmission output power gear, 41 . . . Front side auxiliary transmission case, 41a . . . Upper inner circumferential face, 41b . . . Front wall portion, 41c . . . Mating face, 42 . . . Rear side auxiliary transmission case, 42a . . . Upper portion, 42b . . . Bottom inner face, 43fh . . . Bearing recessed portion ("supporting portion" in the present invention), 43fs . . . Shaft end space, 44fh . . . Bearing recessed portion ("supporting portion" in the present invention), 44fs . . . Shaft end space, 50 . . . Auxiliary transmission input gear, 51 . . . Main shaft (input shaft), 61 . . . Auxiliary shaft (transmission driving shaft), 63 . . . High-low speed switching shifter member, 66 . . . Forward-backward switching shifter member, 71 . . . Output power shaft (transmission driven shaft), 80 . . . Transmission driving mechanism, 85 . . . Shift spindle, 90 . . . Shift drum, 101 . . . Oil collecting rib, 101a . . . Recessed portion, 102 . . . Oil collecting rib, 102a . . . Recessed portion, 103 . . . Upper side fuel supply port ("fuel supply port" in the present invention), 104 . . . Lower side fuel supply port ("fuel supply port" in the present invention), 110 . . . Oil level gage, 110a . . . Gage tip end, 111 . . . Oil port, 112 . . . Recessed portion, E . . . Internal combustion engine, G . . . AC generator ("large rotational body" in the present invention), P . . . Power unit, Tm . . . Main transmission, Ts . . . Auxiliary transmission

We claim:

1. A vehicle driving force transmission structure, comprising:
   a main transmission having a transmission shaft group parallel to a crankshaft, the main transmission disposed in a crankcase on a side of the crankshaft;
   a large rotational body disposed at an end of the crankshaft; and
   an auxiliary transmission disposed as a separate body from, and connecting to, the main transmission,
   wherein the auxiliary transmission comprises a transmission shaft group parallel to the transmission shaft group of the main transmission, and disposed so as to form a periphery of the large rotational body,
   wherein the auxiliary transmission comprises a transmission driving mechanism disposed below the large rotational body,
   wherein the auxiliary transmission further comprises a main shaft and an auxiliary shaft at upper and lower positions;
   wherein oil collecting ribs are disposed on an upper inner circumferential face of an auxiliary transmission case corresponding to an end of the main shaft, and
   wherein fuel supply ports are disposed in the auxiliary transmission case and extend from the oil collecting ribs to supporting portions of the main shaft and the auxiliary shaft at the upper and lower positions, respectively.

2. The vehicle driving force transmission structure according claim 1, wherein an output power shaft is disposed on the opposite side of the auxiliary transmission to the transmission driving mechanism with respect to the main shaft and the auxiliary shaft.

3. The vehicle driving force transmission structure according to claim 1, wherein the fuel supply ports disposed at the upper and lower positions are further disposed in parallel directions with respect to each other.

4. The vehicle driving force transmission structure according to claim 1, wherein a heightwise position of a bottom of the transmission driving mechanism is substantially the same as a heightwise position of a bottom of an oil pan on the crankcase side.

5. The vehicle driving force transmission structure according to claim 1, wherein the vehicle driving force transmission structure comprises a power unit.

6. A vehicle driving force transmission structure, comprising:
   a main transmission having a transmission shaft group parallel to a crankshaft, the main transmission disposed in a crankcase on a side of the crankshaft;
   a large rotational body disposed at an end of the crankshaft; and
   an auxiliary transmission disposed as a separate body from, and connecting to, the main transmission,
   wherein the auxiliary transmission comprises a transmission shaft group parallel to the transmission shaft group of the main transmission, and disposed so as to form a periphery of the large rotational body,
   wherein the auxiliary transmission comprises a transmission driving mechanism disposed below the large rotational body,
   wherein an oil port is disposed at an upper portion of the auxiliary transmission,
   wherein an oil level gage that is configured to close up the oil port, is provided, and
   wherein a gage tip end of the oil level gage in the state in which the oil port is closed up, is configured to pass the side of the output power shaft, and is disposed in a recessed portion on a bottom inner face of an auxiliary transmission case.

7. A vehicle driving force transmission structure, comprising:
   a main transmission means for transmitting rotational driving force of an engine, the main transmission means having a transmission shaft group parallel to a crankshaft, and the main transmission means disposed in a crankcase on a side of the crankshaft;
   a large rotational body means for generating a current, the large rotational body means disposed at an end of the crankshaft; and
   an auxiliary transmission means for outputting rotational driving force of the engine, the auxiliary transmission means disposed as a separate body from, and connecting to, the main transmission,
   wherein the auxiliary transmission means comprises a transmission shaft group parallel to the transmission shaft group of the main transmission, and disposed so as to form a periphery of the large rotational body,
   wherein the auxiliary transmission means comprises a transmission driving mechanism disposed below the large rotational body,
   wherein the auxiliary transmission means further comprises a main shaft and an auxiliary shaft at upper and lower positions;
   wherein oil collecting ribs are disposed on an upper inner circumferential face of an auxiliary transmission case corresponding to an end of the main shaft, and
   wherein fuel supply ports are disposed in the auxiliary transmission case and extend from the oil collecting ribs to supporting portions of the main shaft and the auxiliary shaft at the upper and lower positions, respectively.

8. The vehicle driving force transmission structure according claim 7, wherein an output power shaft is disposed on the opposite side of the auxiliary transmission means to the transmission driving mechanism with respect to the main shaft and the auxiliary shaft.

9. The vehicle driving force transmission structure according to claim 7, wherein the fuel supply ports disposed at the upper and lower positions are further disposed in parallel directions with respect to each other.

10. The vehicle driving force transmission structure according to claim 7, wherein a heightwise position of a bottom of the transmission driving mechanism is substantially the same as a heightwise position of a bottom of an oil pan on the crankcase side.

11. The vehicle driving force transmission structure according to claim 7, wherein the vehicle driving force transmission structure comprises a power unit.

12. A vehicle driving force transmission structure, comprising:
   a main transmission means for transmitting rotational driving force of an engine, the main transmission means having a transmission shaft group parallel to a crankshaft, and the main transmission means disposed in a crankcase on a side of the crankshaft;
   a large rotational body means for generating a current, the large rotational body means disposed at an end of the crankshaft; and
   an auxiliary transmission means for outputting rotational driving force of the engine, the auxiliary transmission means disposed as a separate body from, and connecting to, the main transmission,
   wherein the auxiliary transmission means comprises a transmission shaft group parallel to the transmission shaft group of the main transmission, and disposed so as to form a periphery of the large rotational body, wherein the auxiliary transmission means comprises a transmission driving mechanism disposed below the large rotational body, wherein an oil port is disposed at an upper portion of the auxiliary transmission means, wherein an oil level gage that is configured to close up the oil port, is provided, and wherein a gage tip end of the oil level gage in the state in which the oil port is closed up, is configured to pass the side of the output power shaft, and is disposed in a recessed portion on a bottom inner face of an auxiliary transmission case.

\* \* \* \* \*